(12) United States Patent
Steller

(10) Patent No.: US 7,434,872 B2
(45) Date of Patent: Oct. 14, 2008

(54) REINFORCEMENT ELEMENT FOR A LOWER REGION OF A FRONT BUMPER AND FRONT BUMPER FOR A MOTOR VEHICLE PROVIDED WITH THE SAME

(75) Inventor: Claus Steller, Gross-Gerau (DE)

(73) Assignee: GM Global Technology Operations, Inc., Detroit, MI (US)

( * ) Notice: Subject to any disclaimer, the term of this patent is extended or adjusted under 35 U.S.C. 154(b) by 82 days.

(21) Appl. No.: 11/572,342

(22) PCT Filed: Jul. 20, 2005

(86) PCT No.: PCT/EP2005/007918

§ 371 (c)(1),
(2), (4) Date: Jan. 19, 2007

(87) PCT Pub. No.: WO2006/008150

PCT Pub. Date: Jan. 26, 2006

(65) Prior Publication Data

US 2008/0093868 A1 Apr. 24, 2008

(30) Foreign Application Priority Data

Jul. 21, 2004 (DE) .................. 10 2004 035 434

(51) Int. Cl.
*B60J 7/00* (2006.01)

(52) U.S. Cl. .................. 296/193.09; 296/155

(58) Field of Classification Search .......... 296/193.09, 296/187.03, 203.02, 187.04; 293/155, 102, 293/115
See application file for complete search history.

(56) References Cited

U.S. PATENT DOCUMENTS 3,884,516 A * 5/1975 Gallion et al. .............. 293/120

| 6,231,093 | B1 * | 5/2001 | Storer .................. 293/115 |
| 6,540,275 | B1 * | 4/2003 | Iwamoto et al. ........... 293/24 |
| 6,634,702 | B1 * | 10/2003 | Pleschke et al. ....... 296/187.04 |
| 6,886,872 | B2 * | 5/2005 | Matsumoto et al. ........ 293/155 |
| 6,893,064 | B2 * | 5/2005 | Satou ................... 293/155 |
| 7,303,219 | B2 * | 12/2007 | Trabant et al. ....... 296/187.09 |

(Continued)

FOREIGN PATENT DOCUMENTS

| DE | 10304784 | 9/2003 |
| EP | 1038732 | 9/2000 |
| EP | 1065108 | 1/2001 |
| EP | 1103428 | 5/2001 |
| EP | 1238862 | 9/2002 |
| EP | 1241080 | 9/2002 |
| EP | 1300293 | 4/2003 |

(Continued)

*Primary Examiner*—Kiran B. Patel
(74) *Attorney, Agent, or Firm*—Ingrassia Fisher & Lorenz, P.C.

(57) ABSTRACT

The invention discussed above provides a reinforcing element for a lower impact region of a front bumper of a motor vehicle for the protection of pedestrians in case of the impact of a lower leg section against the lower impact region of the front bumper. Here the reinforcing element adjoins the lower region of the front bumper in the direction of travel behind the lower region of the front bumper. The reinforcing element has a base plate with reinforcing ribs attached thereto. It extends substantially in a horizontal direction, approximately across the width of the front bumper. Here for the first time it is proposed that the reinforcing element with its rear end in the longitudinal direction is at least partially supported against a cross strut arranged below the engine compartment. Further, the above invention proposes for the first time a front bumper equipped therewith for a motor vehicle.

15 Claims, 7 Drawing Sheets

U.S. PATENT DOCUMENTS

| | | | |
|---|---|---|---|
| 7,325,861 B2 * | 2/2008 | Zacheiss et al. | 296/187.09 |
| 2002/0129981 A1 * | 9/2002 | Satou | 180/68.6 |
| 2007/0182171 A1 * | 8/2007 | Kageyama et al. | 293/102 |
| 2007/0216198 A1 * | 9/2007 | Nakamae et al. | 296/193.09 |
| 2007/0273166 A1 * | 11/2007 | Tanabe | 293/102 |

FOREIGN PATENT DOCUMENTS

| | | |
|---|---|---|
| EP | 1433664 | 6/2004 |
| JP | 2000006739 | 1/2000 |
| WO | 02074570 | 9/2002 |

* cited by examiner

REINFORCEMENT ELEMENT FOR A LOWER REGION OF A FRONT BUMPER AND FRONT BUMPER FOR A MOTOR VEHICLE PROVIDED WITH THE SAME

CROSS-REFERENCE TO RELATED APPLICATIONS

This application is a U.S. National-Stage entry under 35 U.S.C. § 371 based on International Application No. PCT/EP2005/007918, filed Jul. 20, 2005, which was published under PCT Article 21(2) and which claims priority to German Application No. DE 10 2004 035 434.0, filed Jul. 21, 2004.

BACKGROUND

The present invention concerns a reinforcing element for a lower region of a front bumper of a motor vehicle for the protection of pedestrians in case of the impact of a lower leg section against the lower region of the front bumper, as well as a front bumper for a motor vehicle having a first impact region which is to come into contact with a bumper bar of another motor vehicle, as well as a second lower impact region which is arranged below the first impact region and which is to come into contact with a pedestrian with his lower leg section.

In recent decades the automobile industry has to an increased extent turned to the protection of pedestrians in accidents. Reducing risks of injury in a collision between a motor vehicle and a pedestrian has gained importance considerably over the years.

For example, already decades ago in DE 30 03 568 A there was a discussion about the fact that, in an impact protection device known at the time, the pedestrian-protecting part is to be designed as a padded crossbeam which is arranged lower than the actual bumper and also in front of it. Due to this lower crossbeam, a pedestrian colliding with the vehicle should be hit so low that he is not knocked down and then run over, but tipped over the relatively soft, deformable front part of the vehicle, substantially reducing the risk of injury or at least the seriousness of the injuries. These first pedestrian-protecting parts were not successful in their time, amongst other things due to concerns of the designers as well as because of manufacturing difficulties and owing to the feared impaired aerodynamic properties and feared impaired force effects of the vehicle front.

At the end of the 90s, together with the European automobile industry there was a discussion about international regulations on pedestrian protection for vehicles. Tests were to be developed with which a motor vehicle front section can be qualitatively assessed according to the following criteria: a) impact with a lower leg, b) impact with an upper leg, c) impact with the hip, and d) impact with the head on a bonnet of a motor vehicle.

These endeavors of the European automobile industry and the legislator finally ended in directive 2003/102/EG for the protection of pedestrians and other unprotected road users before and during collisions with motor vehicles.

Some of the criteria for assessing the quality of motor vehicle front sections apply to the requirements for an impact with a lower leg. In this case at a collision speed of 40 km/h the following criteria for ACEA standard phase 1 are to be met: a) a dynamic knee bending angle between upper leg and lower leg is to be less than 21°, b) shearing in the knee or knee shearing displacement is to be less than 6 mm, and c) acceleration of the lower leg is to be less than 200 g (measured at the upper end of the tibia). Further, at a collision speed of 40 km/h the following criteria for ACEA standard phase 2 are to be met: a) a maximum dynamic knee bending angle between upper leg and lower leg of 15°, b) maximum shearing in the knee or knee shearing displacement of 6 mm, and c) maximum acceleration of the lower leg of 150 g (measured at the upper end of the tibia).

Parallel to the work on directive 2003/102/EG, different embodiments of bumper assemblies were proposed by the automobile industry for a front region of a passenger car faced with a casing. Various examples of this are to be found inter alia in EP 1 038 732 B1, in EP 1 103 428 A2, in DE 103 04 784 A1, and in EP 1 300 293 A1.

Further, from practical experience there have become known front bumpers for motor vehicles with a first impact region which is to come into contact with a bumper bar of another motor vehicle, which should also have a second impact region which is arranged below the first impact region and which is to come into contact with a pedestrian with his lower leg section. In this case the bumper is faced with an outer shell which amongst other things is to ensure a pleasant aesthetic external appearance and guarantee desired aerodynamics. Further, the bumper is supported against a cross member which is mounted by means of crash boxes or the like on the longitudinal members of the body. In this case the second, lower impact region is to have a reinforcing element which is frequently also referred to as a so-called "lower bumper stiffener" (LBS for short) for "pedestrian-protection lower leg impact", or can be designated as a reinforcement of the lower front bumper region for the protection of pedestrians in a leg impact.

An embodiment of such a lower bumper stiffener for pedestrian-protection lower leg impact is discussed in EP 1 038 732 B1 which has already been cited above, for example. Here, the second impact region is to be arranged vertically below the first impact region, i.e. the upper and lower impact regions are to be arranged exactly one above the other, so that to the front they form a common vertical front surface. In this case the lower impact region is to be formed by the lower portion of the bumper which is mounted as a second lower cross member below the first cross member thereon by means of vertically arranged spacers. However, there are concerns as to whether with this structural design the relevant strict guidelines for reliable pedestrian protection can be met sufficiently.

Furthermore, in EP 1 038 732 B1 the reinforcing element described there is an integral part of the lower front bumper region with which it is constructed in one piece. This integral reinforcing element has a base plate with the lower side facing towards the ground, which terminates the front bumper horizontally. On this base plate are placed reinforcing ribs which extend from a front wall of the lower front bumper rearwardly in the longitudinal direction and which are arranged parallel and adjacent to each other.

However, known reinforcing elements of this kind have the considerable drawback that, due to the low height of the lower impact region above the ground, they are frequently subject to considerable mechanical impact stresses from below, e.g. when going over high curbs while parking or e.g. when entering a multi-story car park over ramps with abrupt changes of inclination of the roadway, leading to cracks. Repair of the reinforcing element which is integrally formed in the bumper in one piece requires replacement of the whole front bumper. This is associated with considerable costs. The repair costs go up further because the front bumpers are often painted in the color of the car. The necessary painting work including the corresponding work of stripping and building up lead to a loss of use for several days, which causes use of a hire car as a replacement.

Further, in DE 103 04 784 A1, which has already been discussed above, it has been proposed to design the lower impact region in the form of a so-called leg spoiler which is mounted on the bumper bar, extends downwardly and forwardly directed away from the latter, and is additionally supported by a rear, diagonally extending strut against the cross member located behind the upper impact region of the bumper with an absorber element located behind it. In this case a front edge of the leg spoiler should come to lie below the absorber element of the bumper bar, so that in an imaginary vertical section a connecting line between the upper impact region and the lower point of impingement on the leg spoiler which at best allows a vertical front surface to be expected, could arise, as is the case with EP 1 038 732 B1 which has already been cited above, because there the second impact region is located vertically below the first impact region, and which in the rather less favorable, but substantially more likely case yields an impact surface which is slightly obliquely inclined downwardly and rearwardly. However, this favors bending of the leg which has been struck, instead of ensuring that it is gently tipped up obliquely forwards.

With the leg spoiler of DE 103 04 784 A1, localized stresses upon the impact of a vehicle with a lower leg are to be reduced first and foremost. In the initial stage of an impact, the crash energy in the vicinity of the knee is to be absorbed by the damping material of the absorber element, wherein this absorber element first and foremost is to absorb the impact forces of a colliding motor vehicle and is designed accordingly. The leg spoiler then touches the lower leg at a later time at a lower point, in which case dynamic bending of the knee which cannot be avoided in this way, or initial rotation of the lower leg, will already have occurred disadvantageously. The leg spoiler is in this case to exhibit such rigidity that, as a result of the collision load, rearwardly directed bending of the leg spoiler after the fashion of a cantilever arm is caused. During bending, the leg spoiler is to absorb the collision load until maximum bending is achieved.

In this case, however, in DE 103 04 784 A1 the real progression of movement in case of a collision of a pedestrian with a motor vehicle is misjudged. There are also doubts whether with this structural design it is possible for the pedestrian who has been hit to tip over the front of the vehicle onto the bonnet, which is substantially more yielding than the road surface. Satisfactory protection of pedestrians or other unprotected road users is therefore probably not attainable.

In general, therefore, from the point of view of a responsible driver who worries about how he can protect pedestrians and other unprotected road users by passive safety installed in the car, there is an unsatisfactory situation which ultimately generates an attitude of rejection of motor vehicles with such inadequately designed front bumpers, which finally in turn makes it difficult to successfully implement suitable measures for the protection of pedestrians on a broad front.

SUMMARY

Accordingly, it is the object of the present invention, avoiding the drawbacks discussed above, to provide a reinforcing element for a lower region of a front bumper of a motor vehicle of the kind discussed hereinbefore, with which a substantial improvement in the protective properties of a front bumper fitted therewith can be obtained.

A further important aspect of the present invention is to provide a reinforcing element for a lower region of a front bumper of a motor vehicle of the kind discussed hereinbefore, which can be made cheaply, fitted easily and in case of need also repaired at low cost.

This object is achieved by the characteristics of claim 1, as well as by the following characteristics: A front bumper for a motor vehicle having a first impact region which is to come into contact with a bumper bar of another motor vehicle, as well as having a second impact region which is arranged below the first impact region and which is to come into contact with a pedestrian's lower leg section, wherein the bumper has an outer shell and is supported in the first impact region, via an absorber element arranged therebetween, against a cross member which is mounted by means of crash boxes on the longitudinal members of the body, characterized in that in the longitudinal direction of the vehicle (X) behind the second, lower impact region there is provided a reinforcing element which is at least partially supported by its rear end in the direction of travel (X), against a cross strut located below the engine compartment.

Here, a reinforcing element for a lower region of a front bumper of a motor vehicle is proposed for the protection of pedestrians in an impact of a lower leg section, for example, the ankle, the tibia, the fibula or some other part of the lower leg, against the lower region of the front bumper, wherein the reinforcing element adjoins the lower region of the front bumper behind the latter region in the direction of travel, has a base plate with reinforcing ribs attached thereto, and extends substantially in a horizontal direction approximately across the width of the front bumper.

Here it is proposed for the first time that the reinforcing element with its rear end in the direction of travel is at least partially supported against a cross strut arranged below the engine compartment.

This advantageously ensures that, in case of an impact of a pedestrian with a motor vehicle, first his lower leg is hit by the lower bumper region in a leg section as low as possible, and almost at the same time the upper impact region comes into contact with the pedestrian's leg in such a way that reliable tipping of the pedestrian onto the bonnet is guaranteed if there are corresponding speeds during the collision. In this case the possibility of the leg bending or even of the pedestrian being run over is actually almost excluded. At the same time it is ensured that the lower impact region undergoes reliable support in a horizontal direction rearwardly and so cannot yield accidentally, so that dynamic bending of the knee or rotation of the lower leg are to a very large extent prevented. The knee bending angle can also be positively affected or kept as minimal as possible by the fact that the lower impact region is made relatively hard and, compared with this, the upper impact region is made relatively soft. A "directing onto the bonnet" of the pedestrian or reliably tipping of the pedestrian onto the bonnet is thus further favored.

The fact that the lower bumper region is reliably supported at the rear ensures that at every stage of a collision of a pedestrian with the motor vehicle there are clearly defined impact regions of which the position relative to each other cannot change accidentally, so that the progressions of movement which take place in the process can follow a repeatable pattern, and so a predetermined result with respect to pedestrian protection is guaranteed.

Any surplus collision energy is here successfully absorbed in the lower bumper region by the reinforcing element, so that localized stresses are also prevented.

Advantageous developments of the invention are apparent from the features as claimed.

According to a preferred embodiment, it is provided that the cross strut against which the reinforcing element is supported in the horizontal direction rearwardly, forms part of an auxiliary frame linked to the vehicle body. This affords the advantage that the auxiliary frame, which is already available in the engine compartment and which supports or carries inter alia the engine, parts of the gearbox or other components, is also used to support the reinforcing element in the horizontal direction and so enjoys multiple use. In this way additional components are saved. Also, the auxiliary frame affords the advantage that it is designed for greater forces anyway, so that it does not have to be additionally reinforced. Therefore in an advantageous manner there is on the one hand an increase in accident safety and on the other hand a decrease in the number of parts.

In a further preferred embodiment it is provided that the reinforcing element is attached directly or indirectly to the cross strut by adhesion, clipping, welding, riveting, bolting or the like. This affords the advantage of a particularly cheap method of fastening which can be carried out by simple manipulations during assembly of the motor vehicle on the line. Also the advantageous effect of a customer service-friendly, easy-to-exchange reinforcing element manufactured as a separate plate, which can be fitted, dismounted and exchanged without problems, is enhanced.

In a preferred embodiment it is provided that the reinforcing element is supported by its rear side at least in sections against the facing front side of the auxiliary frame cross strut, and the two components, the auxiliary frame cross strut and the reinforcing element, are joined together by means of a fastening strut or assembly strip located above and/or below these two components. This advantageously ensures that, in an impact with the lower bumper region, the resulting forces cannot cause displacement or even dropping of the reinforcing element either rearwards and downwards or rearwards and upwards. Instead it is ensured that any forces which act on the reinforcing element are completely diverted via the auxiliary frame cross strut.

In this case the reinforcing element can be curved in a further advantageous manner and so allow for the packaging conditions which are present depending on the vehicle model, without a possibly resulting, offset force flow in a horizontal direction, which possibly leads to slight twisting or distortion of the non-planar reinforcing element, ultimately having such an adverse effect that the reinforcing element would drop or yield upwards or downwards. Consequently the geometry which is predetermined according to the assembly of the motor vehicle, as defined by the manufacturers, is substantially maintained even in case of a collision with a pedestrian, so that all components which are to contribute to passive safety can reliably develop their protective effect.

As a result of a further preferred embodiment it is provided that the reinforcing element is designed as a separate plate which can be integrated in the lower bumper region. This affords the advantage that for the first time optimization of the plate-like separate reinforcing element can be undertaken with respect to its mechanical properties, without also having to fear problems in case of optimization of the aesthetic appearance of the exterior of the front bumper as encountered by the viewer. Furthermore, optimization of the strength of the reinforcing element can take place without also having to tolerate an impairment of the aerodynamic properties of the front bumper.

Consequently, for the first time the aerodynamic properties, the aesthetic appearance, the structural design, the strength and the other mechanical properties of a front bumper or its lower impact region can be optimized separately, independently of each other, and so overall a substantially better appearance is obtained and at the same time substantially improved protection of pedestrians from the risk of injury is made possible, i.e. ultimately the values are as far below the required limit values as possible.

Furthermore, the separate plate-like reinforcing element according to the invention affords the advantage that, in case of damage to the reinforcing element, for example due to accidentally driving over a particularly high curb or when contacting a ramp of a multi-storey car park, the reinforcing element can be exchanged separately. As a result the huge repair costs can be reduced. This also leads to a substantial increase in acceptance of a motor vehicle designed in this way by the buyer.

Further, the front bumper according to the invention as well as the reinforcing element according to the invention which is provided therefore afford the advantage that they are cheaper to make and substantially easier to apply on the production line.

Lastly, the reinforcing element as a separate component can be substantially more easily adapted in an advantageous manner to the respective bumper system specific to the motor vehicle model. In this case it can also be transferred for the first time without major additional effort to a similar special model of a standard bumper system. Also, the development and alteration costs for the tool for making the reinforcing element are substantially lower, as the tools required for this are smaller. Hence the total costs for the front bumper can be further reduced in an advantageous manner.

According to a preferred embodiment of the reinforcing element it is provided that it can be mounted on the lower bumper region so as to be releasable again as well, as is the case analogously with respect to support in relation to the cross strut, preferably by adhesion, clipping, welding, riveting, bolting or the like. Hence the advantageous effects of a customer service-friendly, easy-to-exchange reinforcing element which have already been discussed above are further enhanced.

In a further preferred embodiment it is provided that the reinforcing ribs in the assembled state of the reinforcing element extend downwardly from the base plate which is at the top with its rear side facing towards the engine compartment. This affords the advantage that a front bumper fitted with this reinforcing element presents a neatly closed-off surface to the engine compartment, offering no points of attack for oil, coolant from the radiator or the like that might possibly run out due to ageing processes, and also in normal everyday use ensuring that dirt, splashes, dirty water or rain water which enters through the engine compartment or is swirled up from the roadway can run off without problems over the planar surface of the back of the reinforcing element, does not stick in any chambers there or settle there and eventually for example in winter lead to frost damage or the like.

The base plate of the reinforcing element is of course preferably to have downwardly projecting ribs, but these can also partly project upwardly. The base plate need not be absolutely flat, but can e.g. as a slightly curved plate adapt by its geometry to the package conditions of the motor vehicle available. The ribs can be push-fitted, riveted, bolted, injection-molded, molded or adhered onto the base plate or be joined to it as an assembly component. The reinforcing or stiffening ribs can be optimally coordinated with each other with respect to the distance between them, in relation to their material thickness, height, length, position, orientation and connections to each other (e.g. as diagonal ribs, transverse ribs, cross ribs or the like) for optimum attainment of the pedestrian's lower leg protection standards, taking into account the vehicle-specific circumstances. The reinforcing ribs do not absolutely have to be rectilinear.

According to a further preferred embodiment it is provided that the reinforcing element is at least partially encased like a shell in a front section in the direction of travel, by the lower bumper region. This affords the advantage of optimum aerodynamic sheathing or encasing of the plate-like reinforcing element. Also, the connection consisting of a shell-like encasing of the bumper region with the reinforcing element produces a particularly well-reinforced and stable construction, so that the required limit values for pedestrian protection can be maintained particularly well.

According to a further preferred embodiment it is provided that the reinforcing ribs extend substantially at right angles from the base plate and are molded from the same material integrally thereon. Therefore in an advantageous manner the reinforcing element can be made extremely cheaply as a fitting made of the same material, for example as a plastic injection molding or the like.

As a result of a further preferred embodiment it is provided that in the base plate and/or between the reinforcing ribs are formed fastening points, preferably latching projections or the like latch-in or clip-in means. This offers a particularly cheap way of fastening the reinforcing element in the lower region of the front bumper. For this purpose it is further provided that the fastening points in the base plate or between the ribs correlate with corresponding fastening points in the shell of the lower bumper region, which are preferably designed as latching openings. Hence the manipulations required to assemble the front bumper according to the invention can be substantially reduced. This ensures in an advantageous manner that the reinforcing element according to the invention, which is available as a separate plate that can be integrated in the lower bumper region, can without problems be integrated with one manipulation in the lower bumper region by latching in. Simplification of the vertical range of manufacture and the assembly processes on the line is a further positive effect.

Further it is provided that the base plate has, in the rear region in the longitudinal direction of the vehicle, cross-shaped reinforcing ribs which are adjoined at the front by longitudinal ribs arranged parallel to each other and oriented substantially in the longitudinal direction. This affords the advantage that the plate-like reinforcing element in the figurative sense is designed as a kind of hand from the wrist of which the rib-like fingers extend forwardly, of which the fingertips take up the collision forces from the lower bumper region, soften the blow in the process and divert the collision energy in a controlled fashion via the wrist. This results in optimum force flow and particularly good protection of the person concerned in the collision.

Furthermore it is provided that the base plate on its rear side facing towards the engine compartment has a radiator deflecting device. In a collision this ensures in an advantageous manner that the radiator is sheared off or torn loose at corresponding predetermined break points and can move freely rearwards, instead of dropping down or being forced against the engine block. In the process the radiator still functions soundly, and the journey with the vehicle can be continued under its own power at least to the next workshop. Thus advantageously in appropriate circumstances a breakdown service can be dispensed with. Also, the standards of the so-called "Danner test" can thus be maintained. Lastly, the result is an improved picture of the damage and accordingly more favorable classification of the vehicle by the insurance companies.

Finally it is provided that the reinforcing element is made of plastic, preferably thermoplastic material. This offers on the one hand in an advantageous manner cheap manufacture and on the other hand the added advantage of production for example within the scope of a plastics injection molding process, which also in turn allows cost-saving effects to be realized. Also, plastic parts of this kind can have a complex structure, obtain high strengths, and at the same time be light and therefore mean no unnecessary weight for the vehicle.

The base plate of the reinforcing element and its ribs can be partially provided with holes or cut-outs for further weight reduction. The reinforcing element will of course preferably be made of plastic, and particularly preferably thermoplastic materials will be used inter alia for reasons of particularly good shaping capacity. Instead, however, glass fiber-reinforced plastics, carbon fiber-reinforced plastics or other composite materials or stable but also lightweight materials can be used. If occasion arises, material reinforcements may be provided, e.g. fillers e.g. also made of metal, inlets, inserts or the like for further stiffening of the reinforcing element.

The object discussed above is further achieved by the fact that a front bumper for a motor vehicle is proposed, having a first impact region which is to come into contact with a bumper bar of another motor vehicle. Further, this front bumper has a second impact region which is arranged below the first impact region and which is to come into contact with a pedestrian with his lower leg section. Here the bumper is covered with an outer shell and supported in the first impact region against a cross member which is mounted by means of crash boxes or the like on the longitudinal members of the body.

Here it is proposed for the first time that in the longitudinal direction of the vehicle behind the second, lower impact region is provided a reinforcing element, as discussed above. In this case the reinforcing element is to be at least partially supported for the first time by its rear end in the longitudinal direction, against a cross strut located below the engine compartment. By this means the advantages discussed above can be obtained in a synergistic manner with a front bumper designed in this way as well. In this respect, reference is made to the above explanations.

BRIEF DESCRIPTION OF THE DRAWINGS

The present invention will hereinafter be described in conjunction with the following drawing figures, wherein like numerals denote like elements, and FIG. 1 in a three-dimensional view obliquely from the front, an embodiment by way of example of an outer shell or facing of a bumper designed as a molding, with an upper and a lower impact region.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
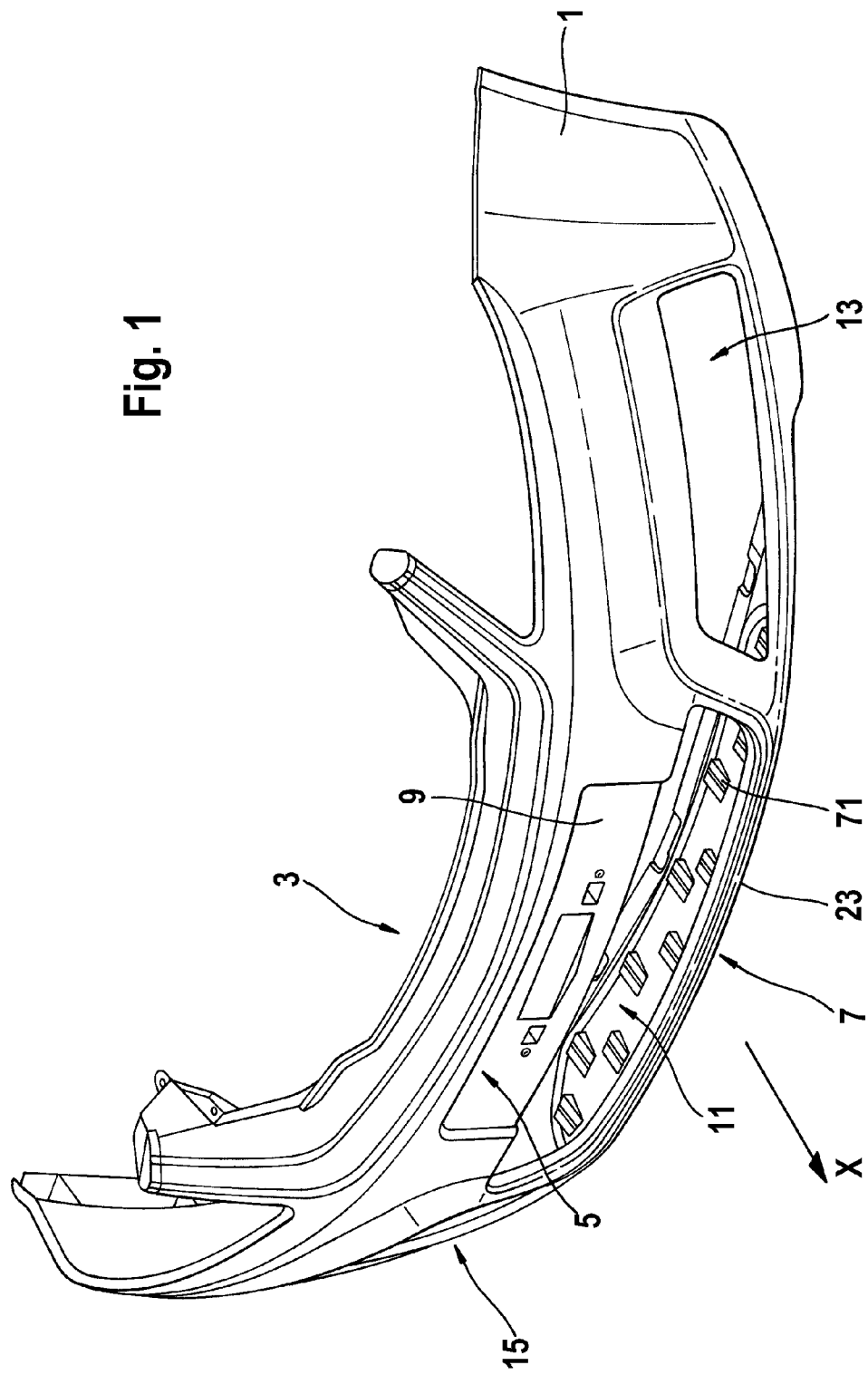

In FIG. 1 in a three-dimensional view obliquely from the front is shown an embodiment by way of example of an outer shell or facing 1 of a bumper 3 having an upper impact region 5 and a lower impact region 7, which shell 1 is designed e.g. as a molding. The facing or shell 1 of the bumper 3 is made in one piece e.g. from thermoplastic material and can be painted in the color of the vehicle. In the upper impact region 5 is located a recess 9 for receiving a number plate, not shown in more detail. Below it can be seen an opening 11 which serves as an air passage for the radiator, not shown in more detail, which is arranged behind the bumper 3. The facing or shell 1 extends essentially across the full width of the motor vehicle, continuing sideway e.g. to above its front corners. To the left and right of the air through-opening 11 are provided further openings 13 and 15 which can serve e.g. to receive deep-set lighting means, for example fog lamps, flashers or the like. The openings 13 and 15 can also be provided with grills and serve as further slots for passage of air.

The lower impact region 7 in the assembled state of the bumper 3 is arranged at a height above the ground or roadway which roughly corresponds to the center of the lower leg of a human being of normal height. The lower impact region 7 can project slightly forwards beyond the upper impact region 5. Further, the lower edge of the lower air through-opening 11 can project approximately the same distance in the longitudinal direction or direction of travel X as the upper edge of the air through-opening 11. It is ensured that when accidentally running into a pedestrian he is first hit so low in the region of the lower leg that he cannot be knocked down and then run over, but is tipped onto the relatively soft, deformable front of the vehicle or bonnet, substantially reducing the risk of injury or at least the seriousness of the injury. At the same time unwanted bending of the lower leg relative to the upper leg in the knee region is prevented.

To ensure that an accidentally hit pedestrian is tipped over the front of the motor vehicle onto the bonnet as mentioned above, however, the lower impact region 7 must exhibit a certain rigidity which cannot be provided only by the facing or shell 1 of the bumper 3. The necessary rigidity is obtained with the reinforcing element 17. The reinforcing element 17 is latched into the latch hook 71.

Figure 2:
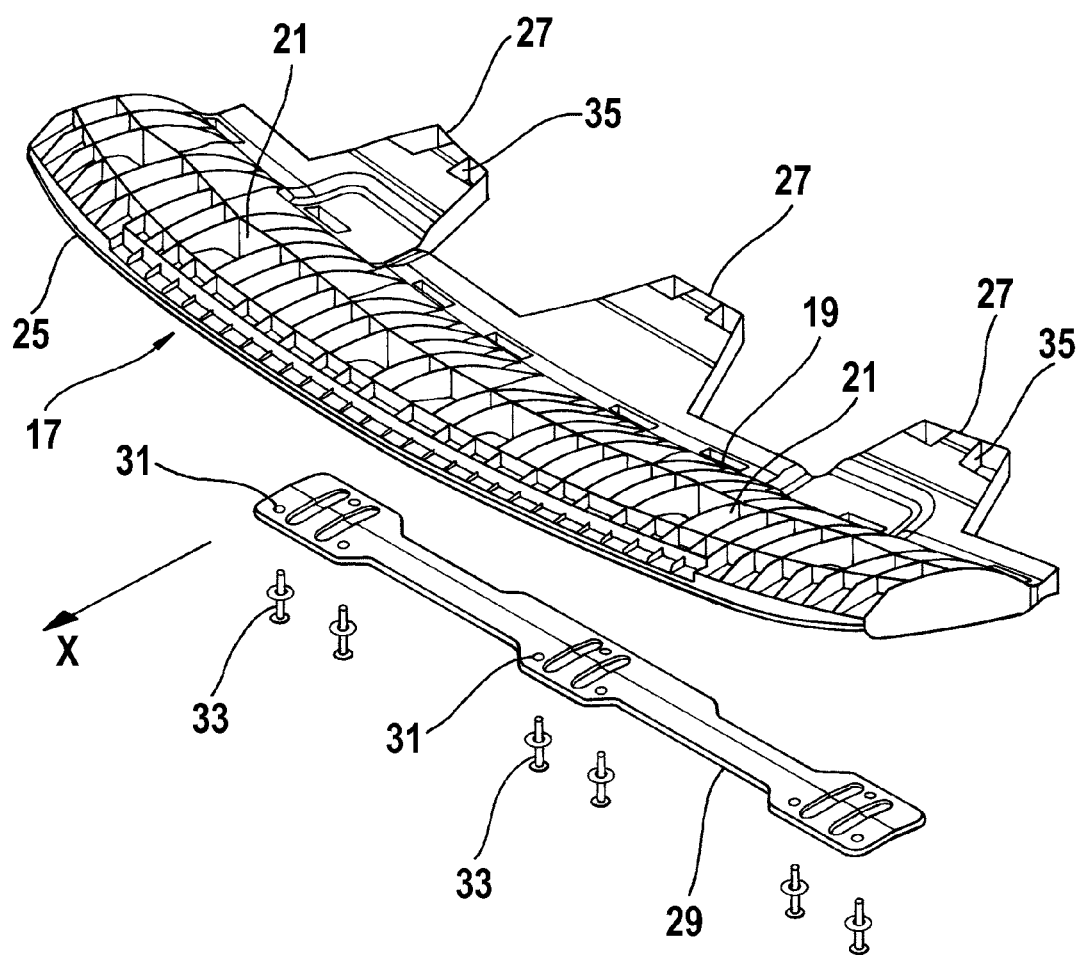
FIG. 2 in a three-dimensional view obliquely from the front, an embodiment by way of example of a reinforcing element which is designed as a separate plate that can be integrated in the lower bumper region, the embodiment shown having a base plate which on both sides (top and bottom) has a grill structure or reinforcing ribs.

In FIG. 2 in a three-dimensional view obliquely from the front is shown an embodiment by way of example of such a reinforcing element 17 which is designed as a separate plate 19 that can be integrated in the lower bumper region 7.

The reinforcing plate 19 in the embodiment shown here to illustrate the reinforcing or stiffening ribs 21 has a base plate which carries ribs on both sides of the base plate, that is, top and bottom. The base plate can nevertheless, depending on the embodiment and application or desired strength, etc., be arranged above and/or below the reinforcing ribs 21. An embodiment in which base plates are arranged on both sides of the reinforcing ribs 21 is also conceivable, as shown in schematically simplified form here. In a preferred embodiment the reinforcing ribs 21 and the base plate arranged above the ribs are made in one piece from a thermoplastic material.

The reinforcing ribs 21 can extend in the longitudinal direction X of the motor vehicle and be arranged parallel and adjacent to each other. Reinforcing ribs can also extend partly transversely thereto. Further, in the rear region of the reinforcing plate 19 are provided intersecting ribs for further reinforcement of the plate 19.

The reinforcing element 17 extends essentially in the horizontal direction approximately across the width of the front bumper 3. The reinforcing element 17 is designed as a separate plate 19 that can be integrated in the lower bumper region 7. The plate 19 does not have to be made absolutely flat, but can with its contour be adapted to be given circumstances and the respective packaging situation of the motor vehicle.

The reinforcing element 17 can be mounted on the lower bumper region 7 by adhering, clipping, welding, riveting, bolting or the like. The reinforcing ribs 21 in the assembled state of the reinforcing element 17 extend downwardly from the base plate which is at the top, for example, with the rear side facing towards the engine compartment, not shown in more detail. The reinforcing element 17 is at least partially encased like a shell with the front section 23 in the direction of travel X, by the lower bumper region 7.

The reinforcing element 17 is in this case integrated with its front section 25 in the front section 23 and supported by arms 27 arranged at its rear end against a fastening element 29 which in turn can be supported e.g. against a corresponding member or corresponding cross strut. The fastening strip or fastening strut 29 is designed as an elongated assembly plate which has holes 31 through which corresponding fastening means 33, for example screws, bolts, rivets, pins or the like, can be passed and hence a firm connection to the reinforcing element 17 can be made. For this purpose the arms 27 have corresponding through-openings or recesses. The arms 27 are formed integrally on the reinforcing plate 19 in the rear region of the latter in the embodiment shown here, and have reinforcing ribs 35.

Figure 3:
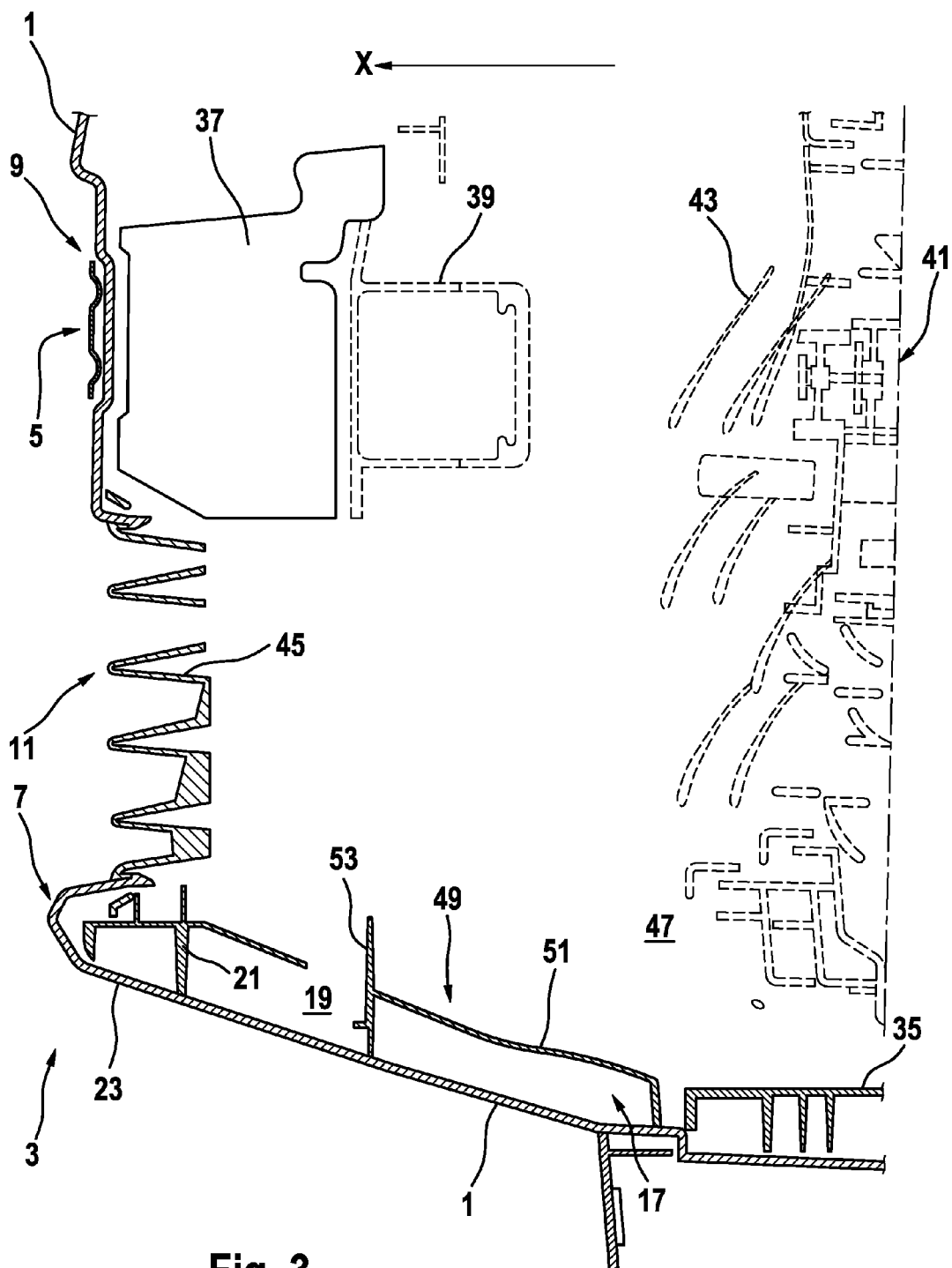
FIG. 3 a vertical section in a first plane extending in the longitudinal direction parallel and close to the vehicle center through the bumper shell shown in FIG. 1 having a reinforcing element integrated in the lower bumper region and shown in FIG. 2, and having an air inlet grill inserted between the upper and lower impact regions below a number plate region included in the upper impact region, and having an absorber element designed as a molding and arranged between the upper impact region of the bumper shell and a cross member arranged behind it (shown in broken lines)

The bumper 3 shown in FIG. 1 and the reinforcing element 17 shown in FIG. 2 are shown in FIG. 3 in a vertical section through a plane located in the longitudinal direction X and arranged parallel to the center of the vehicle. Here the bumper shell 1 and the reinforcing element 7 integrated therein are shown in section with unbroken lines. Further, in FIG. 3 the cross member 39 and a radiator 41 with its fan wheel 43 are shown in broken lines. Between the upper impact region 5 of the facing 1 of the bumper 3 and the cross member 39 is arranged an absorber element 37 for absorbing crash energy.

The cross member 39 is in turn supported against longitudinal members by crash boxes, not shown in more detail here.

The air through-opening 11 through which air can flow to the radiator 41 is covered with a grill 45 which is clipped into the shell 1.

The reinforcing element 17 comprises on the rear side 49 facing towards the engine compartment 47 a base plate 51 from which the reinforcing ribs 21 extend downwardly essentially at right angles and in the embodiment shown are formed integrally on the base plate 51 from the same material.

The reinforcing plate 19 comprises on the rear side 49 of the base plate 51 a radiator deflecting device 53 which faces towards the engine compartment 47 and which ensures that in case of a collision, when the bumper 3 is pushed in, the radiator 41 can be released from its fixing, continues to function soundly and does not drop down.

Figure 4:
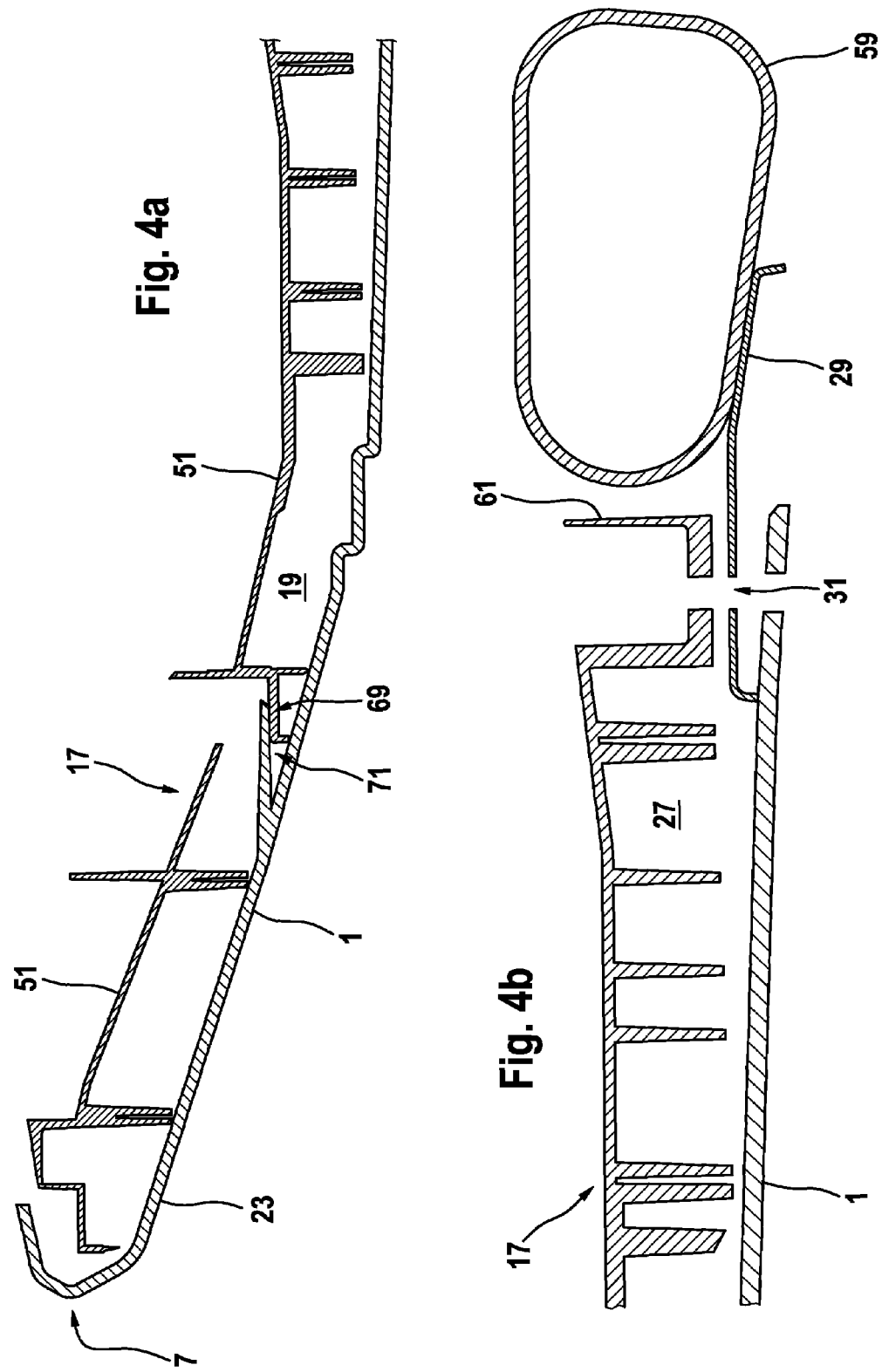
FIG. 4 in each of two partial views a) and b) an enlarged, schematically simplified section of the bumper shown in FIGS. 1 to 3, partial view a) showing in section a latching system between the reinforcing element and the bumper shell, and partial view b) showing in section the connection to the cross strut.

In FIG. 4 are shown in two schematically simplified, enlarged sectional views in partial view a) a front connection of the reinforcing element 17 to the shell 1 of the bumper 3, and in partial view b) a rear connection of the reinforcing element 17 to a cross strut 59.

The reinforcing element 17 is latched or clipped in the lower region 7 of the front bumper 3 in its front section 23 with the latching element 69, which is for example designed as a latching projection, into a correlating latching opening 71. The rear end of the reinforcing element 17 rests by a shoulder 61 of the arm 27 in front of the cross strut 59. Here the arm 27 is attached by the connecting element or fastening strut 29 to the cross strut 59, the rear end of the bumper shell 1 as an outer casing also being held by the connecting element 29 or attached thereto. The reinforcing element 17, the fastening strut 29 and the shell 1 are here joined together with a fastening means, not shown in more detail (cf. e.g. FIG. 2 or 6, reference number 33 there), which is passed through the common opening.

Figure 5:
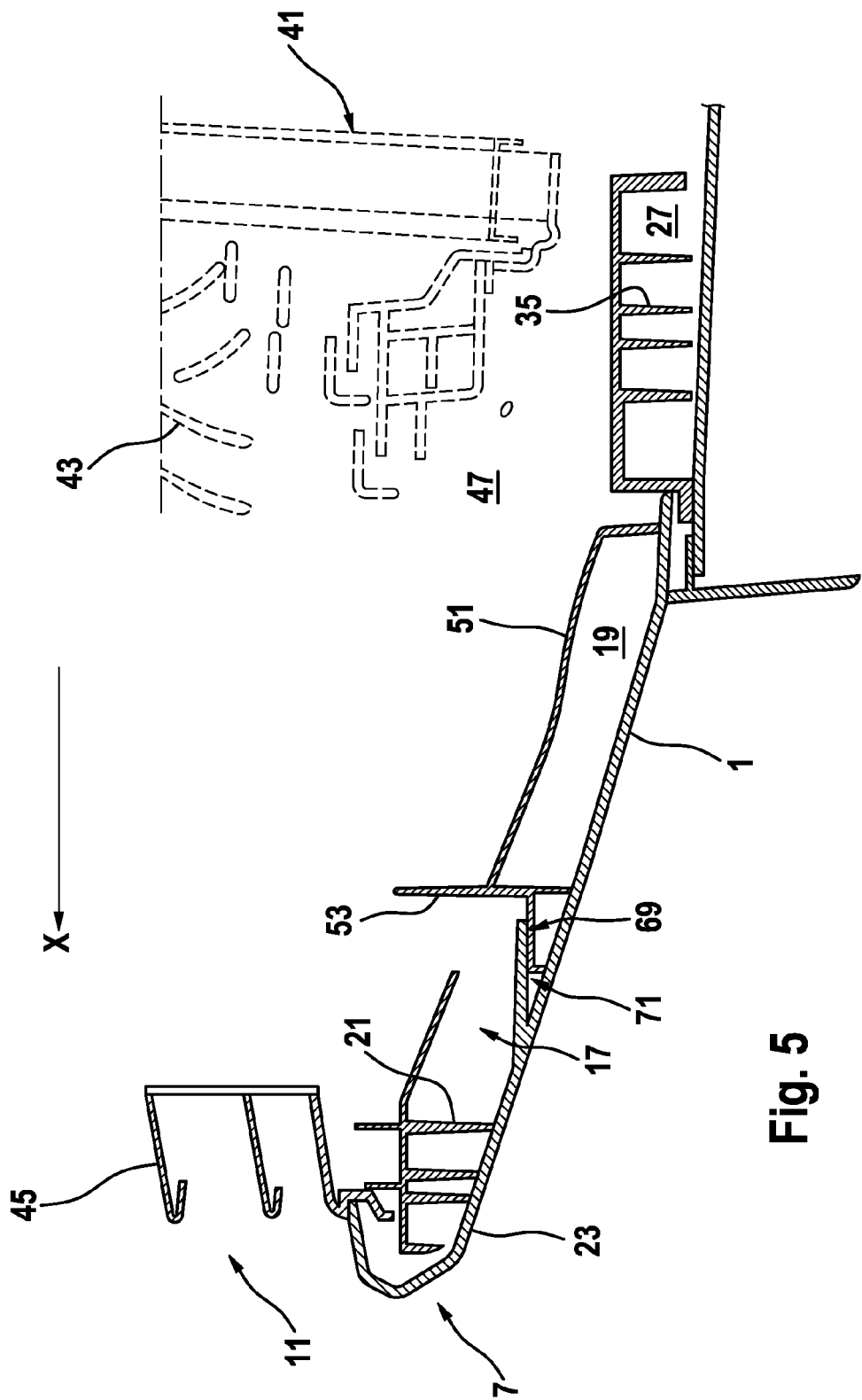
FIG. 5 a vertical section in a further second plane extending in the longitudinal direction at the vehicle center through the bumper shell shown in FIG. 1, having a reinforcing element integrated therein in the lower bumper region and shown in FIG. 2 with the radiator shown in broken lines, latching of the reinforcing element being shown in section.

In FIG. 5 is shown in a vertical section in a further second plane extending in the longitudinal direction X at the center of the vehicle through the bumper shell 1 shown in FIG. 1 a reinforcing element 17 integrated therein in the lower bumper region 7 and shown in FIG. 2 with the radiator 41 shown in broken lines. As is clear from FIGS. 2 to 5, the reinforcing element 17 has different reinforcing ribs 27. The base plate 51 of the reinforcing element 17 carries reinforcing ribs 35 designed for example in a cross shape in the rear region in the longitudinal direction of the vehicle. To the front the reinforcing ribs are for example arranged essentially parallel to each other and extend essentially in the longitudinal direction X. Also, partly for further reinforcement, transverse ribs which cannot be seen in section are provided. The lines partly also show the tapering tips of the longitudinal ribs 21. Further, a latching projection 69 as an example, which is contained in the reinforcing element 17 between the downwardly pointing ribs 21, is shown in section.

Figure 6:
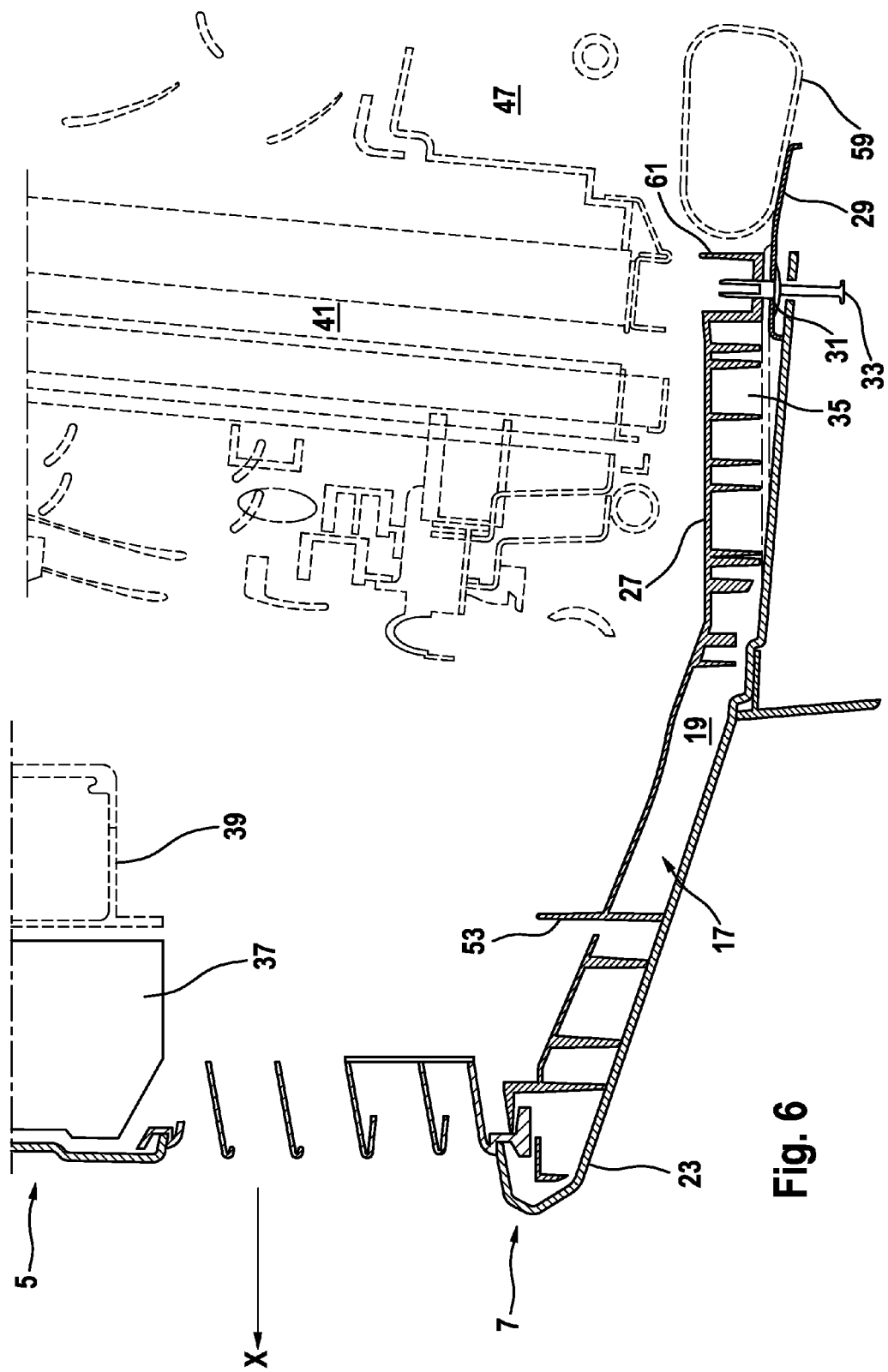
FIG. 6 a vertical section in a further third plane extending in the longitudinal direction just before the vehicle center through the bumper shell shown in FIG. 1, having a reinforcing element integrated therein in the lower bumper region and shown in FIG. 2 with the rear support of the reinforcing element shown in broken lines against a strut arranged below the radiator and shown in broken lines in section.

In FIG. 6 is shown a further section in a fourth plane just before the center of the vehicle, with rear support of the reinforcing element 17 shown in broken lines against a strut 59 which is arranged below the radiator 41 and shown in broken lines in section. The plate-like reinforcing element 17 is supported in its rear region on the cross strut 59 with the elongate fastening element or fastening strut 29, the fastening strut 29 being attached by clips, rivets, bolts or the like fastening means 33 which pass through a bore 31, to at least one arm 27 in the rear region of the reinforcing element 17. In this case the arm 27 of the reinforcing plate 19 can either, as shown here, be supported by means of the fastening strut 29 below the cross strut 59 on the latter, or be attached above the latter. It is essential in this case that the reinforcing element 17 can be supported in the longitudinal direction X rearwardly against the cross strut 59 or a similar component with its rear edge 61 or with corresponding sections in such a way that the reinforcing plate 19 does not give way upwardly or downwardly when there is a load in the longitudinal direction.

As can be seen from FIGS. 1 to 6, the lower impact region 7 protrudes beyond the upper impact region 5, ensuring that the lower leg region of an accidentally struck pedestrian comes into contact with the bumper 3 first.

In FIG. 7 is again shown in a schematically simplified three-dimensional view obliquely from the front at the bottom the embodiment of a front bumper 3 shown in FIGS. 1 to 6 having the separate reinforcing element 17 integrated in the lower impact region 7 of the bumper facing 1, including its rear support against an auxiliary frame 63 arranged below the engine compartment 47.

Figure 7:
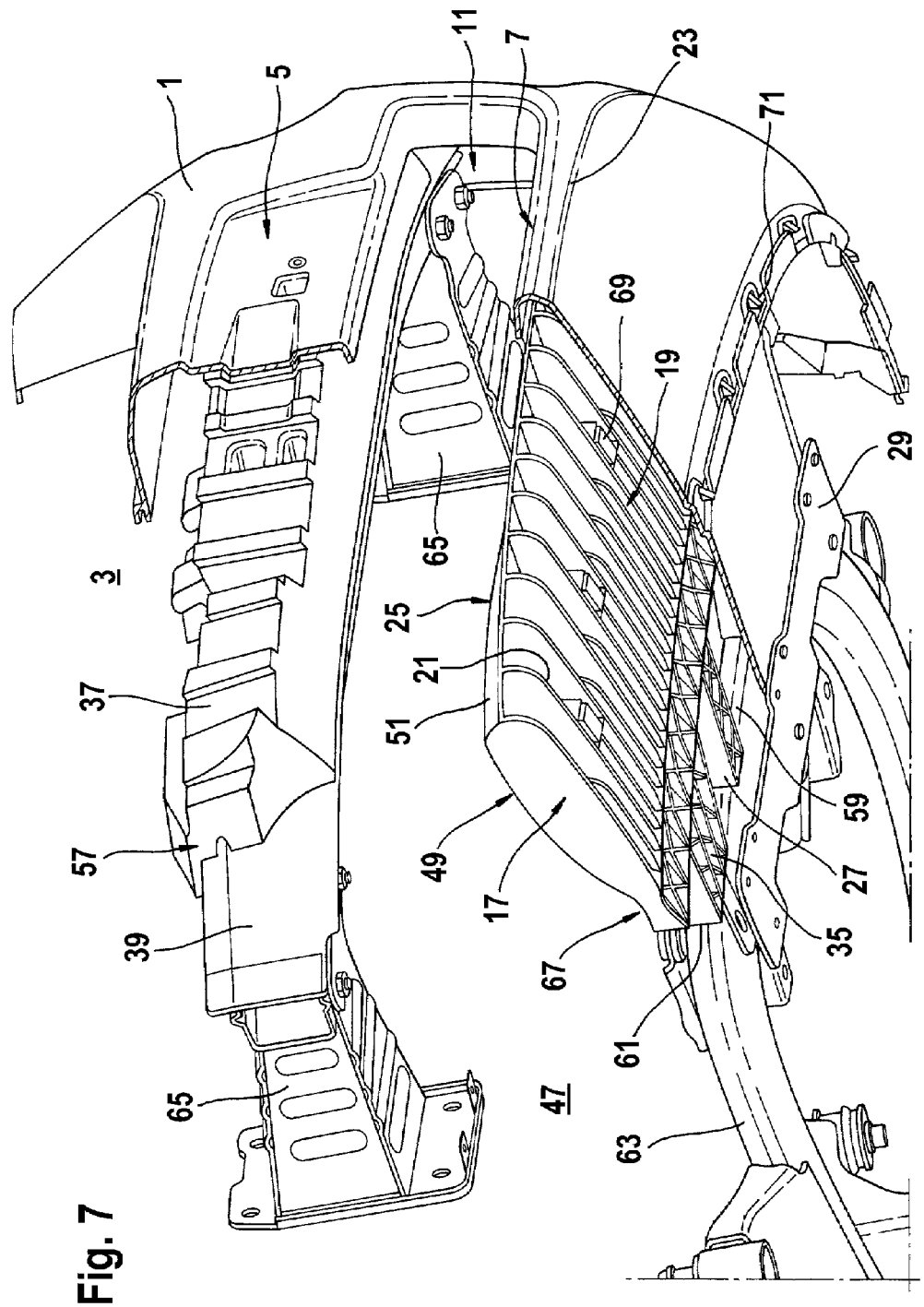
FIG. 7 in a three-dimensional view obliquely from the front and bottom, the embodiment of a front bumper shown in FIGS. 1 to 6, having a separate reinforcing element integrated in the lower impact region of the bumper facing, including its rear support against an auxiliary frame arranged below the engine compartment.

The front bumper system of a motor vehicle shown in FIG. 7 comprises the cross member 39 which is frequently also referred to as the front bumper beam. On the cross member 39 to left and right are mounted so-called holders or brackets or crash boxes 65 by which the cross member 39 is supported against longitudinal members of the motor vehicle, not shown in more detail. In front of the bumper beam or cross member 39 in the direction of travel X is arranged the so-called impact energy absorber or absorber element 37 which can be formed from an E-PP foam part, for example. In front of the absorber element 37 is in turn located the facing 1 for the front bumper 3, the bumper facing 1 frequently also being referred to as the bumper fascia. The lower portion 7 of the bumper facing 1 located below the lower cooling air opening 11 initially forms on its own an unreinforced bumper section, and in the embodiment shown here is also attached at the rear to the auxiliary frame 63 or its cross strut 59.

The reinforcing element 17, which is frequently also referred to as the lower bumper stiffener (LBS for short), is arranged in the lower portion 7 of the bumper facing 1 and clipped in there. In co-operation with the absorber element 37 in front of the cross member 39, the reinforcing element 17 ensures that the strict protection standards relating to the pedestrian's lower leg can be met. Due to the counter-support or the strip-like fastening strut 29 which is attached to the auxiliary frame 63 or its cross strut 59, the reinforcing element 17 cannot give way under the auxiliary frame 63, but in a collision with its rear edge 61 or with its rear end 67 is supported on the cross strut 59 of the auxiliary frame 63. In this case the auxiliary frame 63 is frequently also referred to as the subframe.

The reinforcing element 17 can have a base plate 51 with ribs 21 projecting upwardly or downwardly, for example. In the preferred embodiment shown here, the ribs 21 extend downwardly from the base plate 51. The base plate 51 here does not have to be flat, but can in its respective geometry adapt to the package conditions of the respective motor vehicle. The reinforcing ribs 21 can be injection-molded onto the base plate 51, or joined to it as an assembly component. The reinforcing ribs 21 or the rear stiffening ribs 35 of the rear arms 27 of the reinforcing plate 19 can be optimally coordinated with each other with respect to the distance between them, in relation to their material thickness, height, length, position, orientation and connections to each other (e.g. diagonal ribs, transverse ribs, cross ribs or the like) for optimal attainment of the pedestrian's lower leg protection standards, taking into account the vehicle-specific circumstances. In this case the reinforcing ribs 21 or stiffening ribs 35 do not absolutely have to be rectilinear.

The base plate 51 and the ribs 21 or 35 can be partially provided with holes or cut-outs for weight reduction. The plate-like reinforcing element 17 is for example made as a reinforcing plate 19 from plastic, and particularly preferably thermoplastic material is used. Alternatively glass fiber-reinforced plastics, carbon fiber-reinforced plastics or other composite materials or stable but also lightweight materials could be considered as well. In this case if necessary material reinforcements may be provided, for example fillers also made of metal, inlets, inserts or the like. As a separate component part the reinforcing element 17 can be exchanged for ease of customer service. The reinforcing element 17 can with its front section 25 be inserted in the front section 23 of the lower bumper facing 7 and clipped, welded, riveted and/or bolted to the latter.

In FIG. 7 can just be seen the latching projections 69 contained in the reinforcing element 17 between the downwardly pointing reinforcing ribs 21. With the latching projections the reinforcing element 17 is latched or clipped in the lower region of the front bumper into correlating latching openings 71 which can just be seen.

The counter-support or fastening strut 29 which extends transversely to the longitudinal direction of the vehicle X can be adapted in its shape to the respective geometry of the package conditions of the motor vehicle. If necessary, in the fastening strut 29 can be provided reinforcing beads and/or an edge seam. The counter-support or fastening strut 29 can be adapted in material thickness, size, position, orientation and connections to maintenance and optimization of the pedestrian's lower leg protection standards, taking into account the vehicle-specific circumstances. The counter-support or fastening strut 29 can be partially provided with holes and/or cut-outs for weight reduction. It can be made of plastic, metal or other lightweight and also sufficiently stable materials. Also the counter-support or fastening strut 29 can be exchanged as a component part for ease of customer service. For this purpose it is merely clipped, welded, riveted and/or bolted to the auxiliary frame 63 or to its cross strut 59.

The invention described above provides a reinforcing element for a lower impact region of a front bumper of a motor vehicle for the protection of pedestrians in an impact of a lower leg section against the lower impact region of the front bumper. The reinforcing element in this case adjoins the lower front bumper region behind the lower front bumper region in the direction of travel. The reinforcing element has a base plate with reinforcing ribs attached thereto. It extends essentially in a horizontal direction, approximately across the width of the front bumper. Here it is proposed for the first time that the reinforcing element with the rear end in the longitudinal direction is at least partially supported against a cross strut located in the engine compartment. Further, the above invention discusses for the first time a front bumper equipped therewith for a motor vehicle.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. Reinforcing element for a lower impact region of a motor vehicle front bumper for the protection of pedestrians in case of the impact of a lower leg section against the lower region of the front bumper, wherein the reinforcing element adjoins the lower region of the front bumper in the direction of travel (X) behind the lower region of the front bumper, has a base plate with reinforcing ribs attached thereto, and extends substantially in a horizontal direction approximately across the width of the front bumper, characterized in that the reinforcing element is at least partially supported by means of its rear end in the direction of travel (X) against a cross strut arranged below the engine compartment.

2. Reinforcing element according to claim 1, characterized in that the cross strut is part of an auxiliary frame linked to the vehicle body.

3. Reinforcing element according to claim 1 or 2, characterized in that the reinforcing element is attached directly to the auxiliary frame cross strut by adhesion.

4. Reinforcing element according to claim 1, characterized in that the reinforcing element is supported by its rear side at least in sections against the facing front side of the auxiliary frame cross strut, and the two components are joined together by means of a fastening strut located above these two components.

5. Reinforcing element according to claim 1, characterized in that the reinforcing element is designed as a separate plate which is adapted to be integrated in the lower bumper region.

6. Reinforcing element according to claim 1, characterized in that the reinforcing element is adapted to be mounted on the lower bumper region by adhesion.

7. Reinforcing element according to claim 1, characterized in that the reinforcing ribs extend downwardly from the base plate which is at the top with its rear side facing towards the engine compartment.

8. Reinforcing element according to claim 1, characterized in that the reinforcing element is at least partially encased like a shell in a front section in the direction of travel (X), by the lower bumper region.

9. Reinforcing element according to claim 1 characterized in that the reinforcing ribs (21) extend substantially at right angles from the base plate and are molded from the same material integrally thereon.

10. Reinforcing element according to claim 1, characterized in that fastening points, are formed in the base plate between the reinforcing ribs.

11. Reinforcing element according to claim 1, characterized in that the fastening points in the base plate correlate with corresponding fastening points in the shell of the lower bumper region, which are designed as latching openings.

12. Reinforcing element according to claim 1, characterized in that the base plate has, in the rear region in the longitudinal direction of the vehicle (X), cross-shaped reinforcing ribs which are adjoined at the front by longitudinal ribs arranged parallel to each other and oriented substantially in the longitudinal direction.

13. Reinforcing element according to claim 1, characterized in that the base plate on its rear side facing towards the engine compartment has a radiator deflecting device.

14. Reinforcing element according to claim 1, characterized in that it is made of plastic.

15. Front bumper for a motor vehicle having a first impact region which is to come into contact with a bumper bar of another motor vehicle, as well as having a second impact region which is arranged below the first impact region and which is to come into contact with a pedestrian's lower leg section, wherein the bumper has an outer shell and is supported in the first impact region, via an absorber element arranged therebetween, against a cross member which is mounted by means of crash boxes on the longitudinal members of the body, characterized in that in the longitudinal direction of the vehicle (X) behind the second, lower impact region there is provided a reinforcing element which is at least partially supported by its rear end in the direction of travel (X), against a cross strut located below the engine compartment.

* * * * *